H. W. HAMILTON.
GAS GENERATOR.
APPLICATION FILED DEC. 11, 1911.
1,114,984. Patented Oct. 27, 1914.
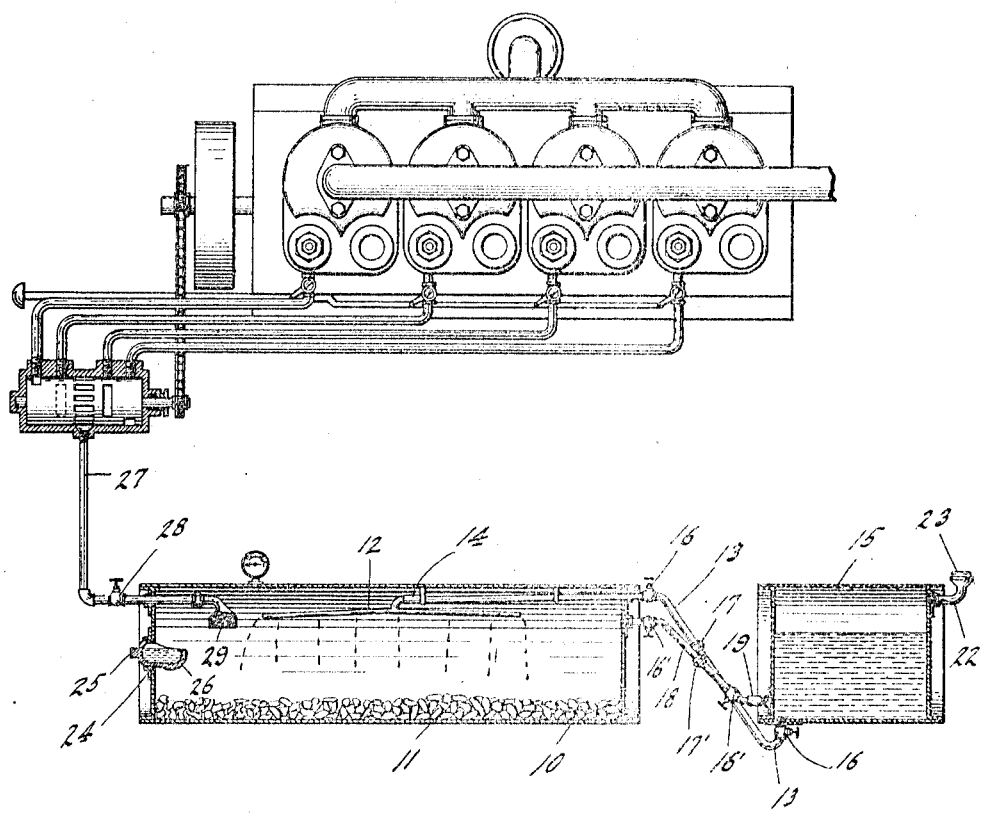
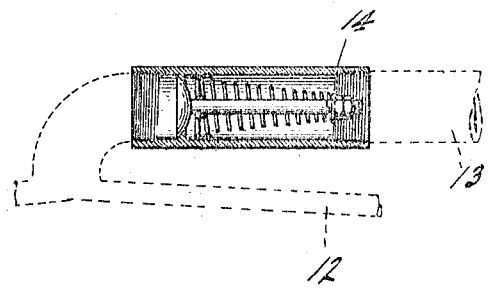
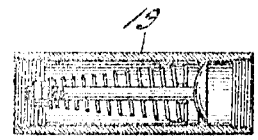
Witnesses
Frank O. Fahle
May Layden
Inventor
Harry W. Hamilton,
By Arthur M. Hood
Attorney

UNITED STATES PATENT OFFICE.

HARRY W. HAMILTON, OF INDIANAPOLIS, INDIANA, ASSIGNOR TO THE HAM-MEIX MANUFACTURING COMPANY, OF INDIANAPOLIS, INDIANA, A CORPORATION OF INDIANA.

GAS-GENERATOR.

1,114,984.  Specification of Letters Patent.  Patented Oct. 27, 1914.

Application filed December 11, 1911. Serial No. 664,982.

*To all whom it may concern:*

Be it known that I, HARRY W. HAMILTON, a citizen of the United States, residing at Indianapolis, in the county of Marion and State of Indiana, have invented a new and useful Gas-Generator, of which the following is a specification.

The object of my invention is to produce a gas generator of such character that its generating action will be automatically dependent upon withdrawal of generated gas therefrom, the construction being such that a material and predetermined quantity of gas must be withdrawn from the apparatus before new generation can be started, and such that the supply of material resulting in regeneration will be discontinued before completion of any particular gas generating action.

My improved apparatus has been more especially designed for the generation of acetylene gas under such conditions that comparatively large volumes of gas may be withdrawn therefrom in such manner as to insure subsequent generation of an amount of gas substantially equal to that withdrawn, but without danger of over-gas production, the generator being thereby especially adapted for use in supplying to an internal combustion engine a sufficient quantity of acetylene or similar gas under sufficient pressure to start the engine from rest.

The accompanying drawings illustrate somewhat diagrammatically my invention.

Figure 1 is an axial section of an embodiment of my invention applied to an internal combustion engine; Fig. 2 a detail of the water supply check valve, and Fig. 3 a detail of the gas return check valve.

In the drawings, 10 indicates a generating tank or chamber adapted to receive a supply of material 11, such for instance as calcium carbid, as one of the elements from which the desired gas is to be generated. Arranged in the upper part of chamber 11 is a water distributing head or sprinkler 12 through which water may be delivered to the carbid. Water is supplied to the head 12 by means of a pipe 13, a check valve 14 being placed between pipe 13 and head 12. The said check valve is so arranged as to prevent any flow of gas from chamber 10 backward through pipe 13 and is also arranged to offer a predetermined resistance to flow of water through pipe 13 to head 12. At its opposite end pipe 13 leads from the lower part of the water tank 15.

In the present form of my apparatus I have shown the tanks 10 and 15 as separable and for that reason provide pipe 13 with a pair of controlling valves 16, 16 and an intermediate coupling 17. It will be readily understood, however, that the two compartments or tanks 10 and 15 need not be separable unless desired.

Leading from the upper part of tank 10 is a pipe 18 the opposite end of which communicates with the interior of tank 15 and arranged in this pipe 18 is a check valve 19, which prevents any flow through pipe 18 from tank 15 to tank 10, the check valve 19 being so arranged as to also offer a predetermined resistance to flow from tank 10 to tank 15. The point of connection of pipe 18 to tank 15 is not especially material although I prefer to lead pipe 18 from a low point in tank 15 so that the check valve 19 may have the benefit of the seal provided by the body of water 21 in the tank 15, it being easier to maintain the check valve 19 tight under such conditions. Pipe 18 is provided with valves 16', 16' and coupling 17', like pipe 13. A desired quantity of water may be introduced into tank 13 through a filling passage 22 covered by a tight cap 23. The carbid 11 may be introduced into tank 10 through any suitable opening such, for instance, as an opening 24 in one head of the tank and, in order to start gas generation, opening 24 is closed by means of a cap 25 provided with a water cup 26 which, when the cap 25 is turned to tight closing position, will deliver its water to the carbid 11.
A suitable discharge pipe 27 provided with a filter 29 and a controlling valve 28 is provided for eduction of gas from tank 10.

The operation is as follows: A measured quantity of carbid 11 is introduced into tank 10 and a corresponding quantity of water 21 is introduced into tank 14. When a quantity of water is then introduced to the carbid by means of a cup 26 to cause an initial production of a quantity of gas within tank 10, there will be a generation of gas and, upon an accumulation of pressure in tank 10 sufficient to overcome the resistance of check valve 19 some of the gas will pass over through pipe 18 into tank 15 and this movement of gas will continue until the gas pressure within tank 15 will be as much less than the pressure in tank 10 as the resistance offered by the two check valves 19 and 14. When the supply of water introduced to the carbid has been consumed, there will be a discontinuance of gas generation and the apparatus will stand indefinitely without further generation until there is a withdrawal of gas through pipe 27. When this withdrawal takes place to a sufficient volume, the pressure within tank 15 will serve to drive a limited quantity of water from tank 15 through pipe 13 past check valve 14 into and through head 12 but the check valve 14 will serve to prevent a rush of too great a quantity of water and, as the generation of the gas begins immediately upon the introduction of water to the carbid, there will be an upbuilding of pressure within tank 10 which will serve to close check valve 14 against the further delivery of water before there has been sufficient gas generation to produce the desired maximum pressure. The flow of water will therefore cease while the generation of gas continues until desired maximum pressure is attained and a sufficient amount of gas has passed over through pipe 18 into tank 15 to compensate for the small outflow of water from tank 15. The check valves 14 and 19 thus serve to prevent too great a flow of water to the carbid as a result of the sudden withdrawal of a desired quantity of gas. As a consequence, the generator is especially applicable for furnishing acetylene or other similar gas to the cylinders of an internal combustion engine in order to initially start such an engine, because by such an arrangement the sudden withdrawal from a generator of a material portion of the generated gas therein, cannot operate to deliver to the remaining carbid so great a quantity of water as will result in an over-production of gas.

I claim as my invention:

1. A gas generator comprising a generating chamber arranged to contain one gas forming material, a second chamber arranged to contain another gas forming material, two passages forming independent and non-gravity communications between the two chambers, a check valve mounted in one of said passages to prevent flow from the generating chamber to the second chamber and to offer a predetermined resistance to flow from the second chamber to the generating chamber, and a check valve mounted in the other passage and preventing flow through said passage from the second chamber to the generating chamber.

2. An acetylene gas generator comprising a generating chamber and a water chamber, a passage leading from the bottom of the water chamber to the upper part of the generating chamber without possibility of gravity flow from the water chamber to the generating chamber and provided at its generator-chamber end with a distributing head, a check valve arranged in said passage to prevent flow therethrough from the generating chamber to the water chamber and to offer a predetermined resistance to flow from the water chamber to the generating chamber, a second passage forming a communication between the generating chamber and water chamber and opening into the generating chamber below the water level therein, and a check valve arranged in said second passage for preventing flow from the water chamber to the generating chamber.

3. An acetylene gas generator comprising a generating chamber and a water chamber, a passage leading from the bottom of the water chamber to the upper part of the generating chamber without possibility of gravity flow from the water chamber to the generating chamber and provided at its generator-chamber end with a distributing head, a check valve arranged in said passage to prevent flow therethrough from the generating chamber to the water chamber and to offer a predetermined resistance to flow from the water chamber to the generating chamber, a second passage forming a communication between the generating chamber and water chamber, and a check valve arranged in said second passage for preventing flow from the water chamber to the generating chamber.

4. A gas generator comprising a generating chamber arranged to contain one gas-forming material, a second chamber arranged to contain another gas-forming material, the two passages forming independent and non-gravity communications between the two chambers, and check valves arranged in said two passages and preventing flow in opposite directions respectively.

5. An acetylene gas generator comprising a generating chamber and a water chamber, two passages connecting said two chambers and each opening into the water chamber below the water level therein, and a check valve arranged in each of said passages, one of said check valves preventing flow through it from the water chamber to the generating chamber and the other preventing flow through it from the generator chamber to the water chamber.

In witness whereof I have hereunto set my hand and seal at Indianapolis, Indiana, this 4th day of December, A. D. one thousand nine hundred and eleven.

HARRY W. HAMILTON. [L. S.]

Witnesses:
  G. B. SCHLEY,
  FRANK A. FAHLE.